US010968372B2

(12) United States Patent
Park et al.

(10) Patent No.: US 10,968,372 B2
(45) Date of Patent: Apr. 6, 2021

(54) PRESSURE-SENSITIVE ADHESIVE COMPOSITION

(71) Applicant: LG Chem, Ltd., Seoul (KR)

(72) Inventors: Geun Ho Park, Daejeon (KR); Sang Ha Son, Daejeon (KR); Sung Soo Yoon, Daejeon (KR); Han Na Chi, Daejeon (KR); Su Jee Kwon, Daejeon (KR); Jeong Ae Yoon, Daejeon (KR); Su Jeong Kim, Daejeon (KR); Chang Hwan Ju, Daejeon (KR); Kyung Oh Kim, Daejeon (KR)

(73) Assignee: LG Chem, Ltd.

( * ) Notice: Subject to any disclaimer, the term of this patent is extended or adjusted under 35 U.S.C. 154(b) by 88 days.

(21) Appl. No.: 16/333,842

(22) PCT Filed: Sep. 22, 2017

(86) PCT No.: PCT/KR2017/010455
§ 371 (c)(1),
(2) Date: Mar. 15, 2019

(87) PCT Pub. No.: WO2018/056743
PCT Pub. Date: Mar. 29, 2018

(65) Prior Publication Data
US 2019/0264077 A1    Aug. 29, 2019

(30) Foreign Application Priority Data

Sep. 23, 2016  (KR) .................. 10-2016-0121976
Sep. 21, 2017  (KR) .................. 10-2017-0121896

(51) Int. Cl.
| | | |
|---|---|---|
| *C09J 153/00* | (2006.01) | |
| *G02B 5/30* | (2006.01) | |
| *G02F 1/1333* | (2006.01) | |
| *G02F 1/13363* | (2006.01) | |
| *G02F 1/1337* | (2006.01) | |
| *C09J 7/38* | (2018.01) | |
| *C08F 299/04* | (2006.01) | |
| *C08F 212/08* | (2006.01) | |
| *C08F 220/18* | (2006.01) | |
| *G02F 1/1335* | (2006.01) | |

(52) U.S. Cl.
CPC ........ *C09J 153/00* (2013.01); *C08F 299/0492* (2013.01); *C09J 7/387* (2018.01); *G02B 5/30* (2013.01); *G02B 5/305* (2013.01); *G02F 1/13363* (2013.01); *G02F 1/133305* (2013.01); *G02F 1/133711* (2013.01); *C08F 212/08* (2013.01); *C08F 220/18* (2013.01); *C09J 2203/318* (2013.01); *C09J 2301/414* (2020.08); *C09J 2425/00* (2013.01); *C09J 2433/00* (2013.01); *C09J 2453/00* (2013.01); *G02F 1/133528* (2013.01); *G02F 2202/28* (2013.01)

(58) Field of Classification Search
CPC ..... C09J 153/00; C09J 2425/00; C08F 212/08
See application file for complete search history.

(56) References Cited

U.S. PATENT DOCUMENTS

| | | | |
|---|---|---|---|
| 2006/0024521 A1 | 2/2006 | Everaerts et al. | |
| 2008/0023132 A1* | 1/2008 | Sano .................... | C09J 133/066 156/275.7 |
| 2009/0270557 A1 | 10/2009 | Tomita et al. | |
| 2010/0188620 A1 | 7/2010 | Kim et al. | |
| 2014/0242303 A1 | 8/2014 | Lee et al. | |
| 2015/0062503 A1* | 3/2015 | Yoon .................... | C09J 153/005 349/96 |
| 2015/0093569 A1 | 4/2015 | Chi et al. | |
| 2016/0289516 A1 | 10/2016 | Makihata et al. | |
| 2018/0282589 A1* | 10/2018 | Chi ....................... | G02F 1/1337 |

FOREIGN PATENT DOCUMENTS

| | | | |
|---|---|---|---|
| CN | 1989216 | A | 6/2007 |
| CN | 105189681 | A | 12/2015 |
| JP | H07082542 | A | 3/1995 |
| JP | H0953069 | A | 2/1997 |
| JP | 2007138057 | A | 6/2007 |
| JP | 3997270 | B2 | 10/2007 |
| JP | 3997271 | B2 | 10/2007 |
| JP | 201168800 | A | 4/2011 |
| JP | 5595321 | B2 | 9/2014 |
| JP | 201596579 | A | 5/2015 |
| JP | 2016528313 | A | 9/2016 |
| KR | 20080094282 | A | 10/2008 |
| KR | 20130135157 | A | 12/2013 |
| KR | 20140147753 | A | 12/2014 |
| KR | 20160085759 | A | 7/2016 |
| TW | 200728423 | A | 8/2007 |

(Continued)

OTHER PUBLICATIONS

Search report from International Application No. PCT/KR2017/010455, dated Jan. 30, 2018.
Search report from from Office Action dated Jun. 27, 2018 in counterpart TW Application No. 20170132681.
Extended European Search Report including Written Opinion for Application No. EP17853457.4 dated Jul. 19, 2019.
Chinese Search Report for Application No. 201780049565.0 dated Apr. 21, 2020, 1 page.

*Primary Examiner* — Jeffrey C Mullis
(74) *Attorney, Agent, or Firm* — Lerner, David, Littenberg, Krumholz & Mentlik, LLP (57) ABSTRACT

A pressure-sensitive adhesive composition that improves not only durability but also bending characteristics of a polarizing plate, an optical laminate and a polarizing plate, both of which are prepared with said pressure-sensitive adhesive composition, and a display device comprising the optical laminate and the polarizing plate.

19 Claims, 1 Drawing Sheet

(56) References Cited

FOREIGN PATENT DOCUMENTS

TW 201516119 A 5/2015
WO 2009104480 A1 8/2009

* cited by examiner

PRESSURE-SENSITIVE ADHESIVE COMPOSITION

CROSS-REFERENCE TO RELATED APPLICATIONS

The present application is a national phase entry under 35 U.S.C. § 371 of International Application No. PCT/KR2017/010455 filed on Sep. 22, 2017, which claims priority from Korean Patent Application No. 10-2016-0121976 filed on Sep. 23, 2016 and Korean Patent Application No. 10-2017-0121896 filed on Sep. 21, 2017, the disclosures of which are incorporated herein by reference in their entirety.

TECHNICAL FIELD

The present application relates to a pressure-sensitive adhesive composition, an optical laminate, a polarizing plate and a display device.

BACKGROUND ART

A liquid crystal display device (hereinafter, referred to as "LCD device") typically comprises a liquid crystal panel containing a liquid crystal component injected between two transparent substrates, and an optical film. The optical film includes a polarizing film, a retardation film, a luminance enhancement film, or the like, where a pressure-sensitive adhesive for an optical film may be used in order to laminate such optical films therebetween or attach the optical films to an adherend such as a liquid crystal panel.

As the pressure-sensitive adhesive, an acrylic polymer, a rubber, a urethane resin, a silicone resin or an ethylene vinyl acetate (EVA) resin may be used. Considering transparency or resistance to oxidation or yellowing, the acrylic copolymer having relatively excellent characteristics above has been widely used.

DISCLOSURE

Technical Problem

It is one object of the present invention to provide a pressure-sensitive adhesive composition for forming a pressure-sensitive adhesive layer which can improve durability and bending characteristics even under high temperature condition at 100° C. or higher and/or high humidity condition at 65° C. and 95%.

It is another object of the present invention to provide an optical laminate, a polarizing plate and a display device which have excellent durability and bending characteristics even under high temperature and/or high humidity conditions.

The above object and other objects of the present application can be all solved by the present application which is described in detail below.

Technical Solution

In one example regarding the present application, the present application relates to a pressure-sensitive adhesive composition. The pressure-sensitive adhesive composition may comprise a block copolymer. In the present application, the term "block copolymer" may designate a copolymer comprising blocks of different polymerized monomers.

The block copolymer may comprise a first block having a glass transition temperature of 50° C. or higher and a second block having a glass transition temperature of −10° C. or lower. In the present application, the "glass transition temperature of the block" constituting the block copolymer may mean the glass transition temperature calculated according to the method described in the following examples.

In one example, the glass transition temperature of the first block may be 50° C. or higher, 60° C. or higher, 70° C. or higher, 75° C. or higher, or 80° C. or higher. The upper limit of the first block glass transition temperature is not particularly limited, and may be, for example, 150° C. or lower, 140° C. or lower, 130° C. or lower, 120° C. or lower, or 110° C. or lower or so.

In one example, the glass transition temperature of the second block may be −10° C. or lower, −20° C. or lower, −30° C. or lower, or −35° C. or lower. The lower limit of the second block glass transition temperature is not particularly limited, but may be, for example, −80° C. or higher, −70° C. or higher, or −60° C. or higher.

The copolymer containing both of the two blocks satisfying the above glass transition temperature range can form a fine phase separation structure in the pressure-sensitive adhesive. Since the block copolymer exhibits appropriate cohesive force and stress relaxation property depending on the temperature change, a pressure-sensitive adhesive having excellent physical properties required of an optical film, such as interface adherence, endurance reliability, light leakage prevention property and re-workability, can be formed.

In one example, the block copolymer of the present application comprising the two blocks may be a diblock copolymer or triblock copolymer. The diblock copolymer may be advantageous in consideration of the interface adherence, endurance reliability, stress relaxation property and re-workability of the pressure-sensitive adhesive.

In one example, the first block of the block copolymer may have a number average molecular weight (Mn) ranging from 10,000 to 250,000. The number average molecular weight of the first block may be, for example, a number average molecular weight of the polymer produced by polymerizing only the monomer forming the first block. The number average molecular weight mentioned in the present application can be measured, for example, by the method shown in the examples using GPC (gel permeation chromatograph). More specifically, in the number average molecular weight (Mn) of the first block, the lower limit may be, for example, 10,000 or more, 15,000 or more, 20,000 or more, 25,000 or more, 30,000 or more, 35,000 or more, 40,000 or more, 45,000 or more, or 50,000 or more. Then, the upper limit may be 250,000 or less, 200,000 or less, 180,000 or less, 150,000 or less, 130,000 or less, or 100,000 or less.

In another example, the first block may have a ratio (Mw/Mn) of the weight average molecular weight (Mw) to the number average molecular weight (Mn), i.e., molecular weight distribution (PDI=Mw/Mn) in a range of 1.0 to 3.0. More specifically, the lower limit of the PDI value of the first block may be 1.0 or more, 1.1 or more, 1.2 or more, 1.3 or more, 1.4 or more, or 1.5 or more, and the upper limit may be 3.0 or less, 2.8 or less, 2.6 or less, 2.4 or less, or 2.2 or less.

In one example, the block copolymer may have a number average molecular weight (Mn) of 500,000 or less. More specifically, in the number average molecular weight (Mn) of the block copolymer, for example, the lower limit may be 100,000 or more, 110,000 or more, 120,000 or more, 130,000 or more, 140,000 or more, 150,000 or more, 160,000 or more, 170,000 or more, 180,000 or more, 190,000 or more, 200,000 or more, 210,000 or more, 220,000 or more, 230,000 or more, 240,000 or more, or 250,000 or more. Then, the upper limit may be 500,000 or less, 450,000 or less, 400,000 or less, or 350,000 or less.

In another example, the block copolymer may have a molecular weight distribution (PDI=Mw/Mn) in a range of 2.0 to 5.0. More specifically, the lower limit of the molecular weight distribution of the block copolymer may be 2.0 or more, 2.1 or more, 2.3 or more, or 2.5 or more, and the upper limit may be 5.0 or less, 4.8 or less, 4.6 or less, 4.4 or less, or 4.2 or less.

As above, when the molecular weight characteristics of the block copolymer are controlled, it is possible to form a pressure-sensitive adhesive having excellent physical properties that are required in an optical film, such as interface adherence, endurance reliability, light leakage prevention property and re-workability.

In one example, the block copolymer may be a cross-linkable copolymer having a cross-linkable functional group. More specifically, the block copolymer may comprise a polymerized unit derived from a compound capable of providing a cross-linkable functional group in the first block and/or the second block.

As the cross-linkable functional group, for example, a hydroxy group, a carboxyl group, an epoxy group, an isocyanate group or a nitrogen-containing functional group may be exemplified. As long as such a cross-linkable functional group can be provided in the first block and/or the second block, the specific kind of compound is not particularly limited. For example, a hydroxy group-containing monomer such as hydroxyalkyl (meth)acrylate or hydroxyalkylene glycol (meth)acrylate; a carboxyl group-containing monomer such as (meth)acrylic acid, 2-(meth)acryloyloxy acetic acid, 3-(meth)acryloyloxy propionic acid, 4-(meth)acryloyloxy butyric acid, acrylic acid dimer, itaconic acid, maleic acid and maleic anhydride or a nitrogen-containing monomer such as (meth)acrylamide, N-vinylpyrrolidone or N-vinylcaprolactam, etc. may be used alone or in combination of two or more.

In the present application, the first block having a relatively high glass transition temperature can form a hard segment having a relatively rigid physical property in the block copolymer. The first block may be present in a glass phase at room temperature and may serve to impart cohesive force to the pressure-sensitive adhesive comprising the block copolymer.

If the block having the glass transition temperature in the above range can be formed, the kind and content of the monomer for forming the first block are not particularly limited.

In one example, the first block may comprise a polymerized unit derived from (meth)acrylic acid ester. In the present application, the term "polymerized unit" may mean a state where the predetermined monomer is polymerized and included in the main chain or side chains of a resin, a polymer or a polymerization reactant formed by polymerizing one or more predetermined monomers.

As the (meth)acrylic acid ester used for forming the first block, for example, alkyl (meth)acrylate may be used. In consideration of cohesive force, glass transition temperature and tackiness control, or the like, alkyl (meth)acrylate having an alkyl group of 1 to 20 carbon atoms, 1 to 16 carbon atoms, 1 to 12 carbon atoms, 1 to 8 carbon atoms or 1 to 4 carbon atoms may be used. An example of such a monomer may include methyl (meth)acrylate, ethyl (meth)acrylate, n-propyl (meth)acrylate, isopropyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate and lauryl (meth)acrylate, and the like, and one or two or more of the foregoing may be selected and used, so that the glass transition temperature is secured.

In one example, the first block may comprise a cross-linkable functional group. For example, the first block may comprise a polymerized unit derived from 80 to 99.9 parts by weight of (meth)acrylic acid ester and a polymerized unit derived from 0.1 to 20 parts by weight of a compound capable of providing a cross-linkable functional group. More specifically, the first block may comprise a polymerized unit derived from 80 to 99 parts by weight of (meth)acrylic acid ester, and a polymerized unit derived from 1 to 20 parts by weight of a compound capable of providing a cross-linkable functional group. In the present application, the "part by weight" may mean a weight ratio between the respective components. For example, as above, the phrase that the first block comprises a polymerized unit derived from 80 to 99.9 parts by weight of (meth)acrylic acid ester and a polymerized unit derived from 0.1 to 20 parts by weight of a compound capable of providing a cross-linkable functional group may mean the case that the ratio (A:B) based on the weight of the (meth)acrylic acid ester monomer (A) and the compound (B) capable of providing a cross-linkable functional group, forming the polymerized units of the first block is 80 to 99.9:0.1 to 20.

When the first block, which is a hard segment, comprises the cross-linkable functional group as above, it is advantageous to improve interface adhesive force through cohesive force control. Also, the first block comprising the cross-linkable functional group can provide excellent durability reliability and stress relaxation property to the pressure-sensitive adhesive even under high temperature condition at 100° C. or higher. In addition, the pressure-sensitive adhesive comprising the first block can maintain excellent bending prevention and light leakage prevention characteristics of the optical film.

In the present application, the second block having a relatively low glass transition temperature can form a soft segment having a relatively soft physical property in the block copolymer. The second block may have molecular flowability at room temperature, and may serve to impart stress relaxation property to the pressure-sensitive adhesive comprising the block copolymer.

If the block having the glass transition temperature in the above range can be formed, the kind and content of the monomer for forming the second block are not particularly limited.

In one example, the second block may comprise a polymerized unit derived from (meth)acrylic acid ester. As the (meth)acrylic acid ester used in forming the second block, for example, alkyl (meth)acrylate may be used as in the first block.

In one example, the second block may comprise a cross-linkable functional group. When the cross-linkable functional group is included in the second block, the block copolymer exhibits appropriate cohesive force and stress relaxation property depending on the temperature change, so that a pressure-sensitive adhesive that physical properties required in an optical film, such as interface adherence, endurance reliability, light leakage prevention property and re-workability, are kept excellent can be formed. The kinds of the cross-linkable functional groups may be the same as those described above.

In one example, each of the first block and the second block may comprise a cross-linkable functional group. Specifically, each of the first block and the second block may have a polymerized unit derived from a compound of Formula 1 below capable of providing a cross-linkable functional group.

[Formula 1]

In Formula 1 above, Q is hydrogen or an alkyl group, A and B are each independently an alkylene group or an alkylidene group, and n is an integer in a range of 0 to 10. Also, when two or more [—O—B—] units in Formula 1 are present, the carbon number of B in each [—O—B—] unit may be the same or different.

In this specification, the term alkyl group may mean a linear, branched or cyclic alkyl group having 1 to 20 carbon atoms, 1 to 16 carbon atoms, 1 to 12 carbon atoms, 1 to 8 carbon atoms or 1 to 4 carbon atoms, unless otherwise specified and the alkyl group may be optionally substituted with one or more substituents. In Formula 1, as the alkyl group, a linear or branched alkyl group having 1 to 12 carbon atoms, 1 to 8 carbon atoms or 1 to 4 carbon atoms may be exemplified. In Formula 1 above, when Q is an alkyl group, the Q may be an alkyl group having 1 to 4 carbon atoms, although it is not particularly limited.

In this specification, the term alkylene group or alkylidene group may mean a linear, branched or cyclic alkylene group or alkylidene group having 1 to 20 carbon atoms, 1 to 16 carbon atoms, 1 to 12 carbon atoms, 1 to 8 carbon atoms or 1 to 4 carbon atoms, unless otherwise specified, which may optionally be substituted with one or more substituents. In Formula 1, for example, A and B may be each independently a linear alkylene group having 1 to 12 carbon atoms, 1 to 8 carbon atoms, or 1 to 4 carbon atoms.

Furthermore, n in Formula 1 may be, for example, 0 to 7, 0 to 5, 0 to 3 or 0 to 2.

As one example of the compound of Formula 1, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and the like may be exemplified, but is not particularly limited to the compounds listed above.

In one example, when A and B are linear alkylene groups, the carbon numbers of A and B contained in the polymerized unit derived from Formula 1 contained in each block may be different from each other. Specifically, the sum of the carbon numbers of the alkylene groups of A and B contained in the polymerized unit derived from Formula 1, which the second block comprises (hereinafter, the side chain carbon number of the second block) may be greater than or equal to the sum of the carbon numbers of the alkylene groups of A and B contained in the polymerized unit derived from Formula 1, which the first block comprises (hereinafter, the side chain carbon number of the first block). For example, when the sum of the carbon numbers of A and B in the polymerized unit derived from Formula 1, which the second block comprises is 4 to 10, the sum of the carbon numbers of A and B in the polymerized unit derived from Formula 1, which the first block comprises may be 4 or less, for example, from 1 to 3. Here, upon calculating the side chain carbon numbers of the first block and the second block, only the carbon number contained in the linear chain alkylene group is taken into consideration even when the substituent containing other carbon is substituted for the linear chain alkylene groups of A and B above. The inventors of the present application have found that when the sum of the carbon numbers of the alkylene group or alkylidene group of A and B contained in the polymerized unit derived from Formula 1, which the second block comprises is larger than that of the first block as above, the reactivity of the second block, which is a soft block, is fast and the cross-linked structure formed by the soft block can contribute to realizing the cohesive force of the pressure-sensitive adhesive. In addition, the cross-linking of the first block formed somewhat late can provide good interface adhesive force for the above reasons. Specifically, after the soft block forms a cross-linked structure, the remaining curing agent or cross-linking agent forms a cross-linked structure on the interface of an optical member, which is an adherend, together with the cross-linkable functional group of the hard block having slow reactivity, whereby good interface adhesive force between the pressure-sensitive adhesive and the optical member, which is an adherend, can be provided. The cross-linking property of such a first block enables the pressure-sensitive adhesive to have some degree of excellent stress relaxation property while maintaining durability under high temperature and high humidity conditions.

In another example, the second block may simultaneously comprise a cross-linkable functional group and an aromatic group. Specifically, the second block may comprise the above-described cross-linkable functional group or the polymerized unit derived from Formula 1 and may comprise a polymerized unit derived from a compound capable of providing an aromatic group simultaneously.

The compound capable of providing an aromatic group in the second block may be, for example, a compound containing a vinyl group and an aromatic group. Such compound may be, for example, styrene or a compound corresponding to Formula 2 below, but is not particularly limited to these compounds.

In one example, the compound containing a vinyl group and an aromatic group may be represented by Formula 2 below.

[Formula 2]

In Formula 2 above, R1 is hydrogen or an alkyl group, R2 is an alkylene group or an alkylidene group, m is an integer of 0 to 5, X is a single bond, an oxygen atom or a sulfur atom, and Ar is an aryl group. The single bond regarding X means, as the case where there is no separate atom in the moiety connected with X, the case where R2 and Ar are directly connected.

The aryl group regarding Formula 2 means a monovalent residue derived from a compound or a derivative thereof containing benzene or a structure in which two or more benzenes are condensed or bonded. The aryl group may be, for example, an aryl group having 6 to 22 carbon atoms, 6 to 16 carbon atoms, or 6 to 13 carbon atoms, and for example, may be a phenyl group, a phenylethyl group, a phenylpropyl group, a benzyl group, a benzyloxy group, a phenoxy group, a tolyl group, a xylyl group, a phenylthio group, a naphthyl group or a naphthyloxy group, and the like.

Then, in Formula 2, m may be, for example, 0 to 4, 0 to 3, 0 to 2, or 0 or 1.

As the compound of Formula 2, phenoxyethyl (meth) acrylate, benzyl (meth)acrylate, 2-phenylthio-1-ethyl (meth) acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth) acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, and the like may be exemplified.

As above, when the aromatic group is included in the second block, the aromatic group may not be included in the first block, but may be included only in the second block. When the aromatic group is included in the second block, the pressure-sensitive adhesive can be formed in which the aromatic group is appropriately oriented in a certain direction and the light leakage prevention property is maintained excellently. Especially, when the pressure-sensitive adhesive is exposed to high temperature or high temperature and high humidity condition, optical compensation may be made by an aromatic group to reduce light leakage phenomenon.

In one example, the second block may comprise a polymerized unit derived from 20 to 98 parts by weight of (meth)acrylic acid ester, a polymerized unit derived from 1 to 40 parts by weight of a compound capable of providing a cross-linkable functional group, and a polymerized unit derived from 1 to 40 parts by weight of a compound capable of providing an aromatic group. In another example, the second block may comprise a polymerized unit derived from 60 to 98 parts by weight of (meth)acrylic acid ester, a polymerized unit derived from 1 to 35 parts by weight of a compound capable of providing a cross-linkable functional group, and a polymerized unit derived from 1 to 35 parts by weight of a compound capable of providing an aromatic group. When the content of the compound constituting the second block satisfies the above range, it is possible to provide a pressure-sensitive adhesive capable of minimizing light leakage while ensuring physical properties such as interface adherence, endurance reliability and proper cohesive force.

In another example, the second block may comprise alkyl (meth)acrylate having an alkyl group having 1 to 3 carbon atoms as a polymerized unit derived from (meth)acrylic acid ester. Specifically, the second block may comprise a polymerized unit derived from 50 parts by weight or less or 45 parts by weight or less of alkyl (meth)acrylate having an alkyl group having 1 to 3 carbon atoms. The lower limit of the content of the alkyl (meth)acrylate having an alkyl group having 1 to 3 carbon atoms is not particularly limited, but may be, for example, 5 parts by weight or more. When the second block comprises the alkyl (meth)acrylate monomer having an alkyl group having 1 to 3 carbon atoms in the above range, it may further contribute to improvement in durability and bending property of the pressure-sensitive adhesive. Specifically, when the degree of chemical cross-linking is high, the durability can be improved, but if the degree is too high, there may be a problem that the bending property deteriorates to that extent. Taking this point into consideration, since the alkyl (meth)acrylate having an alkyl group having 1 to 3 carbon atoms can be more easily entangled than the alkyl (meth)acrylate having an alkyl group having 4 or more carbon atoms, the physical cross-linking that can substitute for chemical cross-linking can be sufficiently imparted to the adhesive resin, thereby providing a pressure-sensitive adhesive having excellent durability and bending characteristics at the same time. In this case, the second block may further comprise a polymerized unit derived from a compound capable of providing a cross-linkable functional group and a polymerized unit derived from a compound capable of providing an aromatic group, or the second block may further comprise a polymerized unit derived from alkyl (meth)acrylate having an alkyl group having 1 to 3 carbon atoms, a polymerized unit derived from alkyl (meth)acrylate having an alkyl group having 4 or more carbon atoms, a polymerized unit derived from a compound capable of providing a cross-linkable functional group and a polymerized unit derived from a compound capable of providing an aromatic group. At this time, the content between the monomers or compounds used in the formation of the second block may be controlled within the same range as the content between the polymerized units derived from the monomers or the compounds described above in relation to the second block composition.

In one example, the block polymer of the present application may comprise 5 parts by weight to 50 parts by weight of the first block having the above configuration and 50 parts by weight to 95 parts by weight of the second block having the above configuration. In another example, the block polymer of the present application may comprise 10 parts by weight to 30 parts by weight of the first block having the above configuration and 70 parts by weight to 90 parts by weight of the second block having the above configuration.

The first block and/or the second block may further comprise any comonomer as needed, where the monomer may be included in each block as the polymerized unit. The comonomer may include a nitrogen-containing monomer such as (meth)acrylonitrile, (meth)acrylamide, N-methyl (meth)acrylamide, N-butoxymethyl (meth)acrylamide, N-vinyl pyrrolidone or N-vinyl caprolactam; an alkylene oxide group-containing monomer such as an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetraalkyleneglycol (meth)acrylic acid ester, an alkoxy polyethyleneglycol (meth)acrylic acid ester, a phenoxy alkyleneglycol (meth) acrylic acid ester, a phenoxy dialkyleneglycol (meth)acrylic acid esters, a phenoxy trialkyleneglycol (meth)acrylic acid ester, a phenoxy tetralkyleneglycol (meth)acrylic acid ester or a phenoxy polyalkylene glycol (meth)acrylic acid ester; a styrenic monomer such as styrene or methylstyrene; a glycidyl group-containing monomer such as glycidyl (meth) acrylate; or a carboxylic acid vinyl ester such as vinyl acetate, and the like, but is not limited thereto. These comonomers may be included in the polymer by selecting one or two or more of suitable types, if necessary. The polymerized unit derived from such a comonomer may be included in each block, for example, in a ratio of 20 parts by weight or less, or 0.1 parts by weight to 15 parts by weight.

The method for producing the block copolymer is not particularly limited, and a known method can be used. For example, the block polymer can be polymerized by an LRP (living radical polymerization) method. Specifically, an anionic polymerization method in which the polymer is synthesized in the presence of an inorganic acid salt such as an alkali metal or alkali earth metal by using an organic rare earth metal complex as a polymerization initiator or using an organic alkali metal compound as a polymerization initiator, an anionic polymerization method in which the polymer is synthesized in the presence of an organoaluminum compound by using an organic alkali metal compound as a polymerization initiator, an atomic transfer radical polymerization method (ATRP) using an atomic transfer radical polymerization agent as a polymerization controlling agent, an ARGET (activators regenerated by electron transfer) atomic transfer radical polymerization method (ATRP) using an atomic transfer radical polymerization agent as a polymerization controlling agent, but carrying out the polymerization under an organic or inorganic reducing agent that generates electrons, an ICAR (initiators for continuous activator regeneration) atomic transfer radical polymerization method (ATRP), a polymerization method (RAFT) by reversible addition-cleavage chain transfer using a reducing agent addition-cleavage chain transfer agent or a method using an organic tellurium compound as an initiator, and the like can be used, and among the methods, an appropriate method can be selected to prepare the block copolymer.

The pressure-sensitive adhesive composition of the present application may comprise one or more cross-linking agents capable of reacting with the cross-linkable functional group of the block copolymer to form a chemical cross-linking structure. Non-limiting examples of cross-linking agents may include isocyanate cross-linking agents, epoxy cross-linking agents, aziridine cross-linking agents or metal chelate cross-linking agents.

In one example, when the cross-linkable functional group is a hydroxy group, an isocyanate cross-linking agent may be used. Specifically, an isocyanate cross-linking agent having at least two functional groups capable of reacting with the cross-linkable functional group of the block copolymer may be used. As such an isocyanate cross-linking agent, for example, a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate; or a compound obtained by reacting the diisocyanate compound with a polyol may be used. As the polyol, trimethylolpropane or the like may be used.

In one example, the pressure-sensitive adhesive composition may comprise 0.01 to 20 parts by weight of a cross-linking agent relative to 100 parts by weight of the block copolymer. More specifically, the lower limit of the cross-linking agent content may be 0.05 parts by weight or more, or 0.10 parts by weight or more, and the upper limit may be 10 parts by weight or 5 parts by weight or less. The degree of cross-linking of the block copolymer can be appropriately controlled within the content range of the cross-linking agent, and accordingly the gel fraction, cohesive force, pressure-sensitive adhesive force and durability, and the like of the pressure-sensitive adhesive can be maintained excellent, but it is preferred that in consideration of bending characteristics, the content is appropriately controlled.

In one example, the pressure-sensitive adhesive composition of the present application may comprise a plasticizer. The plasticizer may impart stress relaxation property to the pressure-sensitive adhesive. The plasticizer of the present application can impart excellent pressure-sensitive adhesive force, re-detachability, light leakage relaxation and durability to the pressure-sensitive adhesive by comprising polyalkylene glycol. Furthermore, when the plasticizer comprising polyalkylene glycol is used together with an antistatic agent as follows, the antistatic performance of the pressure-sensitive adhesive can be further improved. This is because the polyalkylene glycol can chelate the cationic group of the antistatic agent, and suppress the change over time of the antistatic performance, even when the pressure-sensitive adhesive is exposed to high temperature and/or high humidity conditions for a long time, by suppressing ion association of the antistatic agent and improving distribution uniformity of the antistatic agent.

In one example, the plasticizer may be represented by Formula 3 below.

[Formula 3]

In Formula 3 above, Z may be an alkylene group having 2 to 8 carbon atoms. For example, Z may be an alkylene group having 2 to 4 carbon atoms.

In Formula 3 above, L may be a number between 2 and 50. For example, L may be 2 to 40, 2 to 30, 2 to 20, or 2 to 10.

In Formula 3 above, Y1 and Y2 are each independently hydrogen, a hydroxy group, an alkyl group, an alkoxy group, (C=O)R3 or (C=O)R4, provided that at least one of Y1 and Y2 is a functional group containing a carbonyl group. In one example, Y1, which is a functional group containing a carbonyl group, may be (C=O)R3, and Y2, which is a functional group containing a carbonyl group, may be O(C=O)R4.

In Formula 3 above, R3 and R4 may be each independently an alkyl group, an alkenyl group, or an aryl group. Here, the alkyl group may mean an alkyl group having 2 to 20 carbon atoms, 2 to 18 carbon atoms or 2 to 16 carbon atoms, and the alkenyl group may be an alkenyl group having 2 to 20 carbon atoms, 2 to 18 carbon atoms or 2 to 16 carbon atoms, and the aryl group may be an aryl group having 6 to 25 carbon atoms, 6 to 20 carbon atoms, 6 to 15 carbon atoms or 6 to 12 carbon atoms.

With respect to the plasticizers, the alkyl group, alkylene group or alkenyl group may designate a linear, branched, or cyclic alkyl group and may be optionally substituted with one or more substituents. Here, in the range of the alkyl group, a haloalkyl group, which is described below, may also be included.

With regard to the plasticizer, the aryl group may mean a monovalent residue derived from benzene, a compound comprising a benzene structure, or derivatives of any of the foregoing. A specific kind of the aryl group may be exemplified by a phenyl group, a benzyl group, a biphenyl group or a naphthalenyl group, and the like, but is not limited thereto. Furthermore, in the category of the aryl group, a so-called aralkyl group or arylalkyl group, and the like as well as a functional group typically called an aryl group may also be included.

With regard to the plasticizer, the substituent which may optionally be substituted on the alkyl group and the like may be exemplified by halogen such as chlorine or fluorine, a haloalkyl group, an epoxy group such as a glycidyl group, a glycidylalkyl group, a glycidoxyalkyl group or an alicyclic epoxy group, an acryloyl group, a methacryloyl group, an isocyanate group, a thiol group, an alkyl group, an alkoxy group or an aryl group, and the like, but is not limited thereto.

Among the plasticizers represented by Formula 3 above, one or more plasticizers may be used.

The specific kind of the plasticizer is not particularly limited. For example, as the plasticizer, polyethylene glycol bis(2-ethylhexanoate), polypropylene glycol bis(2-ethylhexanoate), polyethylene glycol monooleate, polypropylene glycol monooleate, polyethylene glycol dioleate, polypropylene glycol dioleate, polyethylene glycol dibenzoate, polypropylene glycol dibenzoate, polyethylene glycol monolaurate, polypropylene glycol monolaurate, polyethylene glycol dilaurate, polypropylene glycol dilaurate, polyethylene glycol distearate, polypropylene glycol distearate, polyethylene glycol monostearate or polypropylene glycol monostearate may be used.

The plasticizer may have, for example, a number average molecular weight (Mn) of 100 to 1,000. The lower limit of the number average molecular weight of the plasticizer may be, for example, 200 or more, 300 or more, or 400 or more. The upper limit of the number average molecular weight of the plasticizer may be, for example, 900 or less, 800 or less, or 700 or less. When the number average molecular weight of the plasticizer satisfies the above range, the pressure-sensitive adhesive having excellent in stress relaxation characteristics and durability can be provided.

The plasticizer may be included in an amount of 0.01 to 10 parts by weight relative to 100 parts by weight of the block copolymer. The lower limit of the content of the plasticizer may be, for example, 0.1 parts by weight or more, 1 part by weight or more, or 1.5 parts by weight or more. The upper limit of the content of the plasticizer may be, for example, 7 parts by weight or less, 5 parts by weight or less, or 3 parts by weight or less. By adjusting the content of the plasticizer within the above range, it is possible to provide a pressure-sensitive adhesive composition having excellent re-detachability and durability.

The pressure-sensitive adhesive composition of the present application may further comprise an antistatic agent. As the antistatic agent, for example, an ionic compound may be used. As the ionic compound, an organic salt or an inorganic salt may be exemplified.

As the inorganic salt, for example, a metal salt containing a metal ion as a cation may be used. The metal salt may comprise, for example, an alkali metal cation or an alkaline earth metal cation. The cation may be exemplified by one or two or more of lithium ion ($Li^+$), sodium ion ($Na^+$), potassium ion ($K^+$), rubidium ion ($Rb^+$), cesium ion ($Cs^+$), beryllium ion ($Be^{2+}$), magnesium ion ($Mg^{2+}$)), calcium ion ($Ca^{2+}$), strontium ion ($Sr^{2+}$) and barium ion ($Ba^{2+}$), and the like.

As the organic salt, for example, an ionic compound containing an organic cation may be used. As the organic cation, an onium cation may be exemplified. In this specification, the term onium cation may mean a positively (+) charged ion comprising a structure in which at least some of charges are localized to an atom such as nitrogen (N), phosphorus (P) and/or sulfur (S). The onium cation may be a cyclic or acyclic compound, and when it is cyclic, it may be an aromatic or non-aromatic compound. The onium cation may further comprise other atoms such as oxygen or carbon atoms in addition to the nitrogen, phosphorus and/or sulfur. The onium cation may be optionally substituted with a substituent such as halogen, an alkyl group or an aryl group. For example, the acyclic compound may include one or four or more substituents, where the substituent may be a cyclic or acyclic substituent, or an aromatic or non-aromatic substituent.

The onium cation may be exemplified by, for example, a quaternary ammonium ion such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium or N-ethyl-N,N,N-trioctylammonium, phosphonium, pyridinium, imidazolium, pyrolidinium or piperidinium, and the like.

The anion included in an ionic compound such as an inorganic salt and an organic salt may be exemplified by, for example, $PF_6^-$, $AsF^-$, $NO_2$, fluoride ($F^-$), chloride ($Cl^-$), bromide ($Br^-$), iodide ($I^-$), perchlorate ($ClO_4^-$), hydroxide ($OH^-$), carbonate ($CO_3^{2-}$), nitrate ($NO_3^-$), trifluoromethanesulfonate ($CF_3SO_3^-$), sulfonate ($SO_4$), hexafluorophosphate ($PF_6$), methylbenzene sulfonate ($CH_3(C_6H_4)SO_3^-$), p-toluene sulfonate ($CH_3C_6H_4SO_3^-$), tetraborate ($B_4O_7^{2-}$), carboxybenzene sulfonate ($COOH(C_6H_4)SO_3^-$), floromethane sulfonate ($CF_3SO_2$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_4)_4^-$) or trispentafluoroethyl trifluorophosphate ($P(C_2F_5)_3F_3^-$), and the like.

In another example, as the anion, an anion or bifluorosulfonylimide represented by Formula 4 below, and the like may also be used.

$$[D(GO_mR_f)_n]^-$$ [Formula 4]

In Formula 4, D is a nitrogen atom or a carbon atom, G is a carbon atom or a sulfur atom, $R_f$ is a perfluoroalkyl group, m is 1 or 2, and n is 2 or 3.

In Formula 4, when G is carbon, m may be 1; when G is sulfur, m may be 2; when D is nitrogen, n may be 2; and when D is carbon, n may be 3.

The anion or bis(fluorosulfonyl)imide of Formula 4 exhibits high electronegativity due to the perfluoroalkyl group ($R_f$) or the fluorine group, and also contains a specific resonance structure, thereby forming a weak bond with the cation and simultaneously having hydrophobicity. Accordingly, the ionic compound can impart high antistatic characteristics thereto even in a small amount, while exhibiting excellent compatibility with other components of the composition such as a polymer.

$R_f$ in Formula 4 may be a perfluoroalkyl group having 1 to 20 carbon atoms, 1 to 12 carbon atoms, 1 to 8 carbon atoms or 1 to 4 carbon atoms, where the perfluoroalkyl group may have a linear, branched or cyclic structure. The anion of Formula 4 may be a sulfonymethide-, sulfonylimide-, carbonylmethide- or carbonylimide-based anion, and specifically, one or a mixture of two or more of tristrifluoromethane sulfonylmethide, bistrifluoromethane sulfonylimide, bisperfluorobutane sulfonylimide, bispentafluoroethane sulfonylimide, tristrifluoromethane carbonylmethide, bisperfluorobutane carbonylimide or bispentafluoroethane carbonylimide, and the like.

The ratio of the antistatic agent can be adjusted in consideration of the desired antistatic property and the like. In one example, the composition comprises 0.1 to 20 parts by weight, 0.1 to 15 parts by weight, 0.1 to 10 parts by weight, 0.1 to 5 parts by weight, 0.1 to 3 parts by weight, or 0.5 to 3 parts by weight of an antistatic agent relative to 100 parts by weight of the block copolymer.

In one example, the adhesive composition may further comprise a silane coupling agent. As the silane coupling agent, for example, a silane coupling agent having a beta-cyano group or an acetoacetyl group can be used. Such a silane coupling agent can impart excellent adherence and adhesive stability to a pressure-sensitive adhesive, and can provide endurance reliability under high-temperature and high-humidity conditions.

As the silane coupling agent having a beta-cyano group or an acetoacetyl group, for example, a compound represented by Formula 5 or 6 below can be used.

$$(R_5)_n Si(R_6)_{(4-n)} \quad [\text{Formula 5}]$$

$$(R_7)_n Si(R_6)_{(4-n)} \quad [\text{Formula 6}]$$

In Formulas 5 and/or 6, R5 is a beta-cyanoacetyl group or a beta-cyanoacetylalkyl group, R7 is an acetoacetyl group or an acetoacetylalkyl group, R6 is an alkoxy group, and n is a number of 1 to 3.

Here, in Formulas 5 and 6, the alkoxy group may be an alkoxy group having 1 to 20 carbon atoms, 1 to 16 carbon atoms, 1 to 12 carbon atoms, 1 to 8 carbon atoms or 1 to 4 carbon atoms, and such an alkoxy group may be linear, branched or cyclic.

Also, in Formulas 5 and 6 above, n may be, for example, 1 to 3, 1 to 2 or 1.

The compound corresponding to Formulas 5 and 6 may be exemplified by, for example, acetoacetylpropyl trimethoxysilane, acetoacetylpropyl triethoxysilane, beta-cyanoacetylpropyl trimethoxysilane or beta-cyanoacetylpropyl triethoxysilane, and the like, but is not limited thereto.

The pressure-sensitive adhesive composition may comprise 0.01 to 5 parts by weight or 0.01 to 1 part by weight of a silane coupling agent relative to 100 parts by weight of the block copolymer, and within this range, the desired physical properties may be effectively imparted to the pressure-sensitive adhesive.

The pressure-sensitive adhesive composition may further comprise a tackifier, if necessary. As the tackifier, for example, one or a mixture of two or more of a hydrocarbon resin or hydrogenated product thereof, a rosin resin or hydrogenated product thereof, a rosin ester resin or hydrogenated product thereof, a terpene resin or hydrogenated product thereof, a terpene phenol resin or hydrogenated product thereof, a polymerized rosin resin or a polymerized rosin ester resin, and the like, may be used, but is not limited thereto. The tackifier may be included in the pressure-sensitive adhesive composition in an amount of 100 parts by weight or less relative to 100 parts by weight of the block copolymer.

Besides, the pressure-sensitive adhesive composition may further comprise additives such as an epoxy resin, a curing agent, an ultraviolet stabilizer, an antioxidant, a toning agent, a reinforcing agent, a filler, a defoaming agent, a surfactant or a plasticizer. The specific kind or content of the additive is not particularly limited.

In one example regarding the present application, the pressure-sensitive adhesive composition may be a pressure-sensitive adhesive composition for a protective film. The protective film can be used, for example, for protecting the surface of various optical films.

In another example regarding the present application, the pressure-sensitive adhesive composition may be a pressure-sensitive adhesive composition for an optical film. For example, the pressure-sensitive adhesive composition for an optical film can be used as a use for laminating optical films such as a polarizing film, a retardation film, an anti-glare film, a wide viewing angle compensation film or a luminance enhancement film to each other, or attaching the optical film or laminate thereof to an adherend. In one example, the pressure-sensitive adhesive composition may be a pressure-sensitive adhesive composition used as a use for attaching a polarizing film to a liquid crystal panel as a pressure-sensitive adhesive composition for a polarizing plate.

The present application relates to a pressure-sensitive adhesive optical laminate. An exemplary optical laminate may comprise an optical film; and a pressure-sensitive adhesive layer present on at least any one side of the optical film. The pressure-sensitive adhesive layer may be, for example, a pressure-sensitive adhesive layer for attaching the optical film to a liquid crystal panel or the like of an LCD device or other optical films. Also, the pressure-sensitive adhesive layer may comprise the pressure-sensitive adhesive composition of the present invention as described above. The pressure-sensitive adhesive composition may be contained in the pressure-sensitive adhesive layer in a state of realizing a cross-linked structure. Here, the optical film may be exemplified by a polarizing plate, a polarizer, a retardation film or a luminance enhancement film, and the like, or a laminate in which two or more of the foregoing are laminated. In this specification, the term polarizing plate and polarizer designate objects that are distinguished from each other. That is, the polarizer designates a film, sheet or element itself exhibiting a polarization function, and the polarizing plate means an optical element comprising other components together with the polarizer. Other elements that can be included in the optical element together with the polarizer can be exemplified by a polarizer protective film or a retardation layer, and the like, but is not limited thereto.

The present application also relates to a pressure-sensitive adhesive polarizing plate. The polarizing plate may have, for example, a structure in which the optical film is a polarizer in the pressure-sensitive adhesive optical laminate.

The type of the polarizer included in the polarizing plate is not particularly limited, and for example, general types known in the art, such as a polyvinyl alcohol-based polarizer, can be adopted without limitation.

A polarizer is a functional film capable of extracting only light oscillating in one direction from light incident while oscillating in various directions. Such a polarizer may be, for example, a form in which a dichroic dye is adsorbed and oriented on a polyvinyl alcohol-based resin film. The polyvinyl alcohol-based resin constituting the polarizer can be obtained by, for example, performing gelation of a polyvinyl acetate-based resin. In this case, the usable polyvinyl acetate-based resin may include not only homopolymers of vinyl acetate but also copolymers of vinyl acetate and other monomers copolymerizable therewith. Here, an example of the monomer copolymerizable with vinyl acetate may include one or a mixture of two or more of unsaturated carboxylic acids, olefins, vinyl ethers, unsaturated sulfonic acids, and acrylamides having an ammonium group, but is not limited thereto. The polyvinyl alcohol-based resin may have a gelation degree of, typically, about 85 mol % to 100 mol %, preferably, 98 mol % or more. The polyvinyl alcohol-based resin may also be further modified, and for example, polyvinyl formal or polyvinyl acetal modified into aldehydes, and the like may also be used. The polyvinyl alcohol-based resin may have a polymerization degree of, typically, 1,000 to 10,000 or so, or 1,500 to 5,000 or so.

The polarizer may be produced through a process of stretching the above polyvinyl alcohol-based resin film (e.g., uniaxially stretching), a process of dyeing the polyvinyl alcohol-based resin film with a dichroic dye and adsorbing the dichroic dye, a process of treating the polyvinyl alcohol-based resin film adsorbed by the dichroic dye with a boric acid aqueous solution and a process of washing after treating with the boric acid aqueous solution, and the like. Here, as the dichroic dye, iodine or a dichroic organic dye, and the like may be used.

Also, the polarizing plate may further comprise a protective film attached to one or both sides of the polarizer, and in this case, the pressure-sensitive adhesive layer may be formed on one or both sides of the protective film. In one example, the pressure-sensitive adhesive layer may be formed on the side opposite to the polarizer of the protective film. The kind of the protective film is not particularly limited, and for example, a film having a laminated structure of one or two or more layers, such as a cellulose-based film such as TAC (triacetyl cellulose); a polyester-based film such as a polycarbonate film or PET (poly(ethylene terephthalate)); a polyether sulfone-based film; or a polyethylene film, a polypropylene film or a polyolefin-based film produced by using a resin having a cyclo or norbornene structure, or an ethylene-propylene copolymer, and the like can be used. Considering the securing of moisture barrier characteristics, PET and polyolefin-based films can be used, and considering the securing of durability, acrylic films can be used.

Furthermore, the polarizing plate may further comprise at least one functional layer selected from the group consisting of a protective layer, a reflective layer, an antiglare layer, a retardation film, a wide view angle compensation film and a luminance enhancement film.

In the present application, the method of forming the pressure-sensitive adhesive layer on the polarizing plate or the optical film is not particularly limited, and for example, a method of directly coating the pressure-sensitive adhesive composition on the polarizing plate or the like and curing it to realize a cross-linked structure can be used, or a method in which the pressure-sensitive adhesive composition is coated and cured on the release-treated surface of a release film to form a cross-linked structure and then transferred, and the like can be used.

The method of coating the pressure-sensitive adhesive composition is not particularly limited, and for example, a method of applying a pressure-sensitive adhesive composition by a conventional means such as a bar coater can be used.

In the coating process, the cross-linking agent contained in the pressure-sensitive adhesive composition is preferably controlled from the viewpoint of performing a uniform coating process so that the cross-linking reaction of the functional groups does not proceed, whereby the cross-linking agent may form a cross-linked structure in the curing and aging process after the coating operation to improve the cohesive force of the pressure-sensitive adhesive and to improve the pressure-sensitive adhesive physical properties and cuttability.

The coating process is also preferably performed after sufficiently removing the bubble-inducing component such as the volatile component or the reaction residue in the pressure-sensitive adhesive composition and accordingly, it is possible to prevent problems that the cross-linking density or molecular weight of the pressure-sensitive adhesive is too low to lower the elastic modulus, and bubbles existing between the glass plate and the pressure-sensitive adhesive layer at a high temperature state are enlarged to form scattering bodies therein, and the like.

The method of curing the pressure-sensitive adhesive composition after coating to realize a cross-linked structure is also not particularly limited. For example, a method of maintaining the coating layer at an appropriate temperature so that a cross-linking reaction between the block copolymer and the polyfunctional cross-linking agent contained in the coating layer can be induced.

The present application also relates to a display device. When the display device is an LCD, the device may comprise a liquid crystal panel and the polarizing plate or optical laminate attached to one or both sides of the liquid crystal panel. The polarizing plate or optical laminate may be attached to the liquid crystal panel by the above-described pressure-sensitive adhesive.

The liquid crystal panel may comprise, for example, a first substrate, a pixel electrode, a first alignment film, a liquid crystal layer, a second alignment film, a common electrode, and a second substrate, which are sequentially formed. In one example, the first substrate and the second substrate may be glass substrates. In this case, the polarizing plate or optical laminate may be attached to the glass substrate via the above-described pressure-sensitive adhesive layer.

The device may further comprise a light source on the opposite side of the viewing side of the liquid crystal panel. In the first substrate on the light source side, for example, an active driving circuit comprising TFTs (thin film transistors) as a driving element electrically connected to the transparent pixel electrode and wiring, and the like may be formed. The pixel electrode comprises, for example, ITO (indium tin oxide) or the like, and can function as an electrode for each pixel. In addition, the first or second alignment film may comprise, for example, a material such as polyimide, but is not limited thereto.

As the liquid crystal panel in the device, for example, all the known panels of a passive matrix mode panel such as a TN (twisted nematic) type, an STN (super twisted nematic) type, an F (ferroelectic) type or a PD (polymer dispersed) type; an active matrix mode panel such as a two-terminal or a three-terminal type; a transverse electric field type (IPS: in plane switching) panel and a vertical alignment type (VA) panel, and the like may be applied.

Types of other configurations of the display device, for example, upper and lower substrates such as a color filter substrate or an array substrate in a liquid crystal display device, and the like are not particularly limited, and configurations known in this field can be adopted without limitation.

Advantageous Effects

According to one example of the present application, the present application can provide a pressure-sensitive adhesive composition which can improve durability and bending characteristics even at high temperature condition at 100° C. or higher and/or high humidity condition at 65° C. and 95%, when used for a protective film or an optical film.

BEST MODE

Hereinafter, the present application will be described in detail through examples. However, the scope of protection of the present application is not limited by the examples described below.

The physical properties in these examples and comparative examples were evaluated in the following manner.

1. Evaluation of Molecular Weight Characteristics

The number average molecular weight (Mn) and the molecular weight distribution (PDI) of the block or block copolymer were measured using GPC (gel permeation chromatograph), and the GPC measurement conditions were as follows. The measurement results were converted using standard polystyrene (manufactured by Aglient system) for preparing the calibration curve.

<GPC Measurement Conditions>

Measuring instrument r: Aglient GPC (Aglient 1200 series, U.S.)

Column: Two PL Mixed B connected

Column temperature: 40° C.

Eluent: THF (tetrahydrofuran)

Flow rate: 1.0 mL/min

Concentration: ~1 mg/mL (100 µl injection)

2. Evaluation of Durability

The polarizing plates prepared in Examples and Comparative Examples were each tailored to have a width of about 106 mm and a length of about 142 mm, and attached to a 7-inch commercial liquid crystal panel. Thereafter, the panel with the attached polarizing plate is stored for about 20 minutes in an autoclave (50° C., 5 atm) to prepare a sample. In the case of the moist-heat resistant durability of the prepared sample, it was evaluated according to the following criteria by observing occurrence of bubbles and peeling at the pressure-sensitive adhesive interface after leaving the sample to stand at 65° C. and 95% relative humidity for 500 hours. In the case of the heat resistant durability, it was evaluated according to the following criteria by also observing occurrence of bubbles and peeling after maintaining the sample at 100° C. for 500 hours.

<Heat Resistant and Moist-Heat Resistant Durability Evaluation Criteria>

A: no bubbles and peeling occurred

B: slight bubbles and/or peeling occurred

C: large amount of bubbles and/or peeling occurred

3. Glass Transition Temperature

The glass transition temperature (Tg) of a block copolymer or each block of the block copolymer was calculated according to Equation A below.

$$1/Tg = \Sigma Wn/Tn \qquad \text{<Equation A>}$$

In Equation above, Wn is a weight fraction of the monomer applied to a block copolymer or each block of the block copolymer, and Tn represents a glass transition temperature when each of the corresponding monomers has formed a homopolymer. That is, in Equation A, the right side is a result of summing up the calculated values after calculating all the values (Wn/Tn) obtained by dividing the weight fraction of the used monomer by the glass transition temperature appearing when the monomer has formed the homopolymer for each monomer.

4. Evaluation of Bending Characteristics

Figure 1:
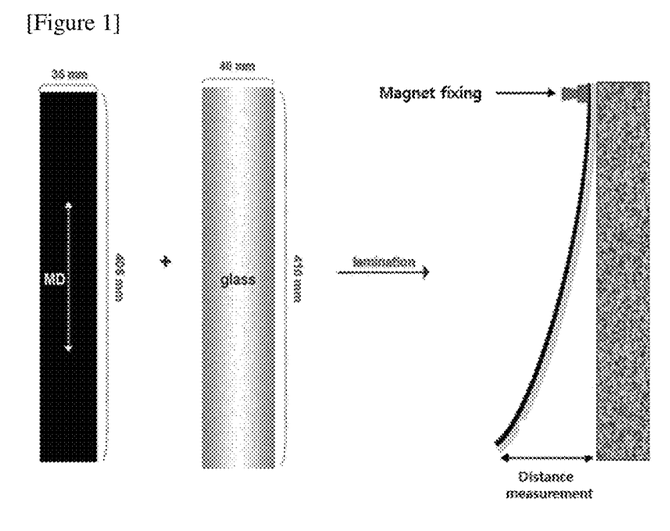
FIG. 1 is a schematic view for explaining a bending characteristic evaluation method in connection with experimental examples of the present application.

The bending characteristics were evaluated using a strip measuring method (glass bending measurement). First, STN sodalime glass (4×41 cm², 0.4 t) for bending is prepared. If there is no foreign material, it is used as such without washing, and if there are foreign materials, it is washed cleanly with EAc and IPA solvents and then dried using an air-gun. A polarizing plate (coated product) with the attached pressure-sensitive adhesive is prepared with a size of 3.5×40.5 cm² in a long MD direction. A specimen is attached to the prepared bending glass using a laminator. After measuring the degree of bending (initial value) in the attached state, it is stored for 72 hours under heat resistant condition at 100° C. As shown in FIG. 1, after preparing a device capable of fixing a sample in a chamber, the sample is fixed on one side of the bending sample, and then the distance from the reference point is measured. At this time, the initial value was subtracted from the measured distance. Three samples were prepared for the same formulation and the average was calculated.

5. In-Plane-Retardation Measurement

Pressure-sensitive adhesives formed from the pressure-sensitive adhesive compositions of Examples and Comparative Examples were each laminated on a primer-treated, non-stretched COP (cyclopolyolefin) film and tailored to a size of 1 cm wide and 5 cm long to prepare a specimen. The pressure-sensitive adhesive surface of this specimen is attached to a 0.7 t thick soda lime glass with a size of 1 cm×1 cm, and then fixed to a jig, and mounted so that the beam of the AXO SCAN equipment can be incident perpendicularly onto the pressure-sensitive adhesive surface. Thereafter, while the specimen is pulled to perform stress deformation on the pressure-sensitive adhesive surface, in-plane-retardation values are read according to the applied force and recorded. As the stress is applied, the optical compensation monomers may be oriented to achieve the optical compensation, where as the value of |R| is closer to 0 from the range of 4 or less due to this optical compensation, it means that the effect of the light leakage reduction in the endurance condition is more excellent.

$$|R| = |R_0 - R_i|$$

$R_0$=in-plane-retardation value in a state where no stress is applied $R_i$=in-plane-retardation value in a state where a stress of 15N is applied 6. Light Leakage Evaluation In order to investigate uniformity of light transmittance, it was observed using a backlight whether there was a light leakage portion in the dark room.

Panel type: LCD module for TN

Specimen: 2 polarizing plates to which the pressure-sensitive adhesive fitting LCD module size is attached Polarizing plate check: polarizing plate tailored in the 45 degree direction with respect to the stretching direction Wide view liquid crystal direction check of polarizing plate: The long side of the polarizing plate is held with both hands and shone vertically on the LCD monitor so that light is not transmitted, and then the long side of the polarizing plate is bent toward the body to check which light of the left and right leaks, where if the light leaking direction is to the right, the down right direction is the liquid crystal direction.

(1) The LCD module is disassembled, the polarizing plate attached to the LCD cell is removed and the cell surface is wiped with EAc.

Figure 2:
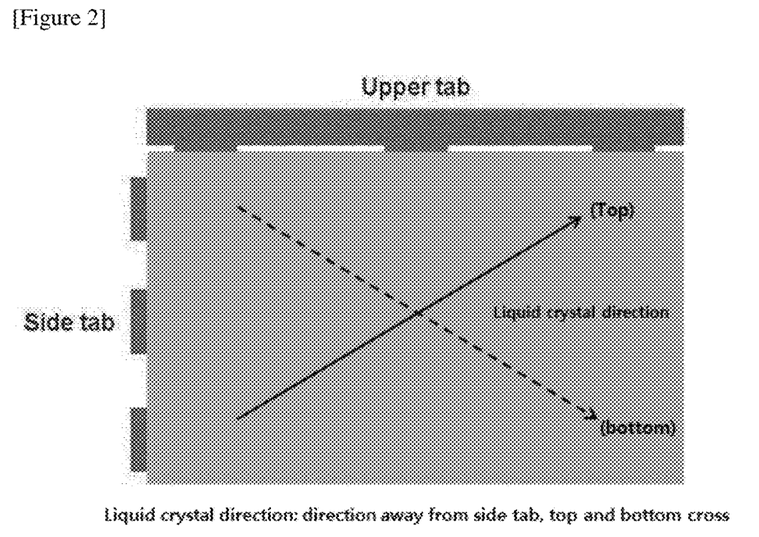
FIG. 2 is a schematic view for explaining a light leakage evaluation method in connection with experimental examples of the present application.

(2) After checking the wide view liquid crystal coating direction of the polarizing plate, the polarizing plate is attached so that the liquid crystal direction faces away from the side tap, as shown in FIG. 2. Two upper and lower specimens are attached to both sides of the cell in the state that the polarized light is crossed, and the direction is aligned so that the top and bottom of the liquid crystal direction cross.

(3) The cell is stored for 240 hours under aging conditions (moist-heat resistant condition: a temperature of 65° C. and 95% relative humidity, heat resistant condition: a temperature of 100° C.), and then left to stand at room temperature for 2 hours to observe the light leakage.

Method of observing light leakage: it was evaluated according to the following criteria by observing the LCD module with the naked eye while driving it.

<Evaluation Criteria>

A: it is difficult to determine the light leakage with the naked eye.

B: slight light leakage

C: some light leakage

D: large amount of light leakage

7. Evaluation of Peel Force

The pressure-sensitive polarizing plates prepared in Examples or Comparative Examples were each tailored so as to have a width of 25 mm and a height of 100 mm to prepare specimens. Subsequently, the release PET film attached to the pressure-sensitive adhesive layer is peeled off and the pressure-sensitive polarizing plate is attached to glass (soda lime glass) using a roller of 2 kg in accordance with the provision of JIS Z 0237. The glass with the attached polarizing plate is squeezed in an autoclave (50° C., 5 atm) for about 20 minutes and stored under constant temperature and humidity conditions (23° C., 50% relative humidity) for 24 hours to prepare a sample. Thereafter, the peel force is measured while peeling the polarizing plate from the glass at a peel rate of 0.3 m/min and a peel angle of 180°, using a TA equipment (Texture Analyzer, manufactured by Stable Micro Systems, UK).

8. Evaluation of Interface Adhesive Force

The polarizing plates prepared in Examples and Comparative Examples were tailored so as to have a width of 25 mm and a height of 100 mm to prepare specimens. Thereafter, the specimen is attached to a PET (poly(ethylene terephthalate)) film via the pressure-sensitive adhesive layer to prepare a laminate, and after maintaining the laminate at room temperature for 3 days, the laminate is attached to a glass substrate with a double-sided tape so that the PET film comes to the top, and then the interface adhesive force is evaluated by measuring the adhesive force between the polarizing plate and the PET film while peeling the PET film at room temperature at a peel rate of 10 mm/sec and a peel angle of 180°.

Preparation Examples of Copolymers

Preparation Example 1. Preparation of Diblock Copolymer (A1)

0.098 g of EBiB (ethyl 2-bromoisobutyrate), 160 g of methyl methacrylate (MMA), 30 g of butyl methacrylate (BMA) and 10 g of hydroxyethyl methacrylate (HEMA) were mixed in 370 g of ethyl acetate (EAc). The reactor containing the mixture was sealed, purged with nitrogen and stirred at about 25° C. for about 30 minutes, and dissolved oxygen was removed through bubbling. Thereafter, 0.0338 g of $CuBr_2$, 0.0876 g of TPMA (tris(2-pyridylmethyl)amine) and 0.226 g of V-65 (2,2'-azobis(2,4-dimethyl valeronitrile)) were introduced to the mixture in which oxygen was removed and the mixture was immersed in a reaction tank at about 67° C. to initiate the reaction (polymerization of the first block). When the conversion of methyl methacrylate was about 70%, a mixture of 888 g of n-butyl acrylate (BA), 15 g of hydroxybutyl acrylate (HBA), 100 g of benzyl acrylate (BzA) and 411 g of ethyl acetate (EAc), which had been previously bubbled with nitrogen, was introduced thereto in the presence of nitrogen. Then, 0.0264 g of $CuBr_2$, 0.0685 g of TPMA and 0.335 g of V-65 were added to the reactor, and a chain extension reaction was carried out (polymerization of the second block). If the conversion of the monomer (BA) reached 80% or more, the reaction mixture was exposed to oxygen and diluted with an appropriate solvent to terminate the reaction, thereby preparing the block copolymer (in the above process, V-65 was appropriately divided and introduced until the end of the reaction in consideration of its half-life).

Preparation Examples 2 to 6. Preparation of Block Copolymers (A2 to A3 and B1 to B3)

Block copolymers were prepared in the same manner as in Preparation Example 1, except that the raw materials used in the polymerization of the first block and the second block were controlled as in Table 1 below.

TABLE 1

| | | Diblock copolymer preparation example | | | | | |
|---|---|---|---|---|---|---|---|
| | | 1<br>A1 | 2<br>A2 | 3<br>A3 | 4<br>B1 | 5<br>B2 | 6<br>B3 |
| First block | MMA ratio | 80 | 70 | 80 | 80 | 70 | 70 |
| | BMA ratio | 15 | 20 | 15 | 10 | 10 | 10 |
| | HEMA ratio | 5 | 10 | 5 | — | 10 | 10 |
| | BzMA ratio | — | — | — | 10 | 10 | 10 |
| | Tg (° C.) | 92 | 84 | 92 | 93 | 88 | 88 |
| | Mn (x10,000) | 8.7 | 5.8 | 8.7 | 8.2 | 5.5 | 5.5 |
| | PDI | 2.01 | 2.05 | 2.01 | 1.98 | 2.1 | 2.1 |
| Second block | BzA ratio | 10 | 20 | 10 | — | — | — |
| | BA ratio | 88.5 | 78 | 78.5 | 98.5 | 100 | 98.5 |
| | HBA ratio | 1.5 | 2 | 1.5 | 1.5 | — | 1.5 |
| | MA ratio | — | — | 10 | — | — | — |
| | Tg (° C.) | −50 | −44.8 | −44.4 | −54.4 | −54 | −54.4 |
| Block co-polymer | Mn (x10,000) | 21.8 | 20.5 | 21.1 | 20.9 | 20.6 | 20.3 |
| | PDI | 3.0 | 3.3 | 3.1 | 3.1 | 3.2 | 3.2 |
| | First block:<br>second block (weight ratio) | 20:80 | 15:85 | 20:80 | 20:80 | 15:85 | 15:85 |

Monomer ratio unit: part by weight
MMA: methyl methacrylate (homopolymer Tg: about 110° C.)
BMA: butyl methacrylate (homopolymer Tg: about 26° C.)
HEMA: hydroxyethyl methacrylate (homopolymer Tg: about 57° C.)
BzMA: benzyl methacrylate (homopolymer Tg: about 52° C.)
BzA: benzyl acrylate (homopolymer Tg: about 6° C.)
BA: n-butyl acrylate (homopolymer Tg: about −54° C.)
HBA: 4-hydroxybutyl acrylate (homopolymer Tg: about −80° C.)
MA: methyl acrylate (homopolymer Tg: about 10° C.)
Mn: number average molecular weight
PDI: molecular weight distribution
Tg: glass transition temperature Preparation Example 7: Preparation of Triblock Copolymer (B4)

1.409 g of EBiB (ethyl 2-bromoisobutyrate), 903 g of butyl acrylate (n-BA, n-butyl acrylate), 31 g of 4-hydroxybutyl acrylate (4-HBA), 103.8 g of benzyl acrylate (BzA) and 335 g of butyl acetate (BAc) were poured into a reactor, sealed, performed nitrogen purging and stirring at about 25° C. for about 30 minutes, and then dissolved oxygen was removed through bubbling. Thereafter, 0.1297 g of $CuBr_2$, 0.3362 g of TPMA (tris(2-pyridylmethyl)amine) and 1.2984 g of V-65 (2,2'-azobis(2,4-dimethyl valeronitrile)) were introduced to the mixture in which oxygen was removed and the mixture was immersed in a reaction tank at about 67° C. to initiate the reaction (polymerization of the second block). When the conversion of methyl methacrylate was about 90%, a mixture of 509 g of methyl methacrylate (MMA), 57 g of styrene and 243 g of butyl acetate (BAc), which had been previously bubbled with nitrogen, was introduced thereto in the presence of nitrogen. Then, 0.5522 g of V-65 was added to the reactor, and a chain extension reaction was carried out (polymerization of the first block into both ends of the second block). If the conversion of the monomer (MMA) reached 80% or more, the reaction mixture was exposed to oxygen and diluted with an appropriate solvent to terminate the reaction, thereby preparing the triblock copolymer having a number average molecular weight (Mn) of 88,000 and a molecular weight distribution (Mw/Mn) of 2.71. Here, the weight ratio of the first block:the second block:the first block is about 15:70:15 (in the above process, V-65 was appropriately divided and introduced until the end of the reaction in consideration of its half-life).

Preparation Examples 8 to 10: Preparation of Block Copolymers (B5 to B7)

A triblock copolymer (B5) was prepared in the same manner as in Preparation Example 7, except that the raw materials used in the polymerization of the first block and the second block were controlled as in Table 2 below. In the case of Table 3, triblock copolymers (B6 and B7) were prepared in the same manner as in Preparation Example 7, except that first, the first block was prepared and the second block was prepared at both ends.

TABLE 2

| | | Triblock copolymer preparation example | |
|---|---|---|---|
| | | 7<br>B4 | 8<br>B5 |
| First block | MMA ratio | 90 | 80 |
| | HEMA ratio | — | 10 |
| | Sty ratio | 10 | 10 |
| | Tg (° C.) | 109 | 103 |
| Second block | BzA ratio | 10 | 10 |
| | BA ratio | 87 | 87 |
| | HBA | 3 | 3 |
| | Tg (° C.) | −50 | −50 |
| First block | MMA ratio | 90 | 80 |
| | HEMA ratio | — | 10 |
| | Sty ratio | 10 | 10 |
| | Tg (° C.) | 109 | 103 |
| Block copolymer | Mn (×10,000) | 8.8 | 8.9 |
| | PDI | 2.71 | 2.74 |
| | First block:second block:first block (weight ratio) | 15:70:15 | 15:70:15 |

Monomer ratio unit: part by weight
MMA: methyl methacrylate (homopolymer Tg: about 110° C.)
HEMA: hydroxyethyl methacrylate (homopolymer Tg: about 57° C.)
Sty: styrene (homopolymer Tg: about 100° C.)
BzA: benzyl acrylate (homopolymer Tg: about 6° C.)
BA: n-butyl acrylate (homopolymer Tg: about −54° C.)
HBA: 4-hydroxybutyl acrylate (homopolymer Tg: about −80° C.)
Mn: number average molecular weight
PDI: molecular weight distribution
Tg: glass transition temperature

TABLE 3

| | | Triblock copolymer preparation example | |
|---|---|---|---|
| | | 9<br>B6 | 10<br>B7 |
| Second block | BzA ratio | 10 | 10 |
| | BA ratio | 87 | 87 |
| | HBA | 3 | 3 |
| | Tg (° C.) | −50 | −50 |

TABLE 3-continued

| | | Triblock copolymer preparation example | |
|---|---|---|---|
| | | 9<br>B6 | 10<br>B7 |
| First block | MMA ratio | 100 | 90 |
| | HEMA ratio | — | — |
| | Sty ratio | — | 10 |
| | Tg (° C.) | 110 | 109 |
| | Mn (×10,000) | 5.3 | 5.2 |
| | PDI | 1.50 | 1.53 |
| Second block | BzA ratio | 10 | 10 |
| | BA ratio | 87 | 87 |
| | HBA | 3 | 3 |
| | Tg (° C.) | −50 | −50 |
| Block copolymer | Mn (×10,000) | 25 | 25.1 |
| | PDI | 2.73 | 2.72 |
| | Second block:first block:second block (weight ratio) | 45:10:45 | 45:10:45 |

Monomer ratio unit: part by weight
MMA: methyl methacrylate (homopolymer Tg: about 110° C.)
HEMA: hydroxyethyl methacrylate (homopolymer Tg: about 57° C.)
Sty: styrene (homopolymer Tg: about 100° C.)
BzA: benzyl acrylate (homopolymer Tg: about 6° C.)
BA: n-butyl acrylate (homopolymer Tg: about −54° C.)
HBA: 4-hydroxybutyl acrylate (homopolymer Tg: about −80° C.)
Mn: number average molecular weight
PDI: molecular weight distribution
Tg: glass transition temperature Preparation Example 11. Preparation of Random Copolymer (B8)

A monomer mixture comprised of 98.5 parts by weight of n-butylacrylate (BA) and 1.5 part by weight of hydroxybutyl acrylate was introduced into a 1 L reactor refluxed by nitrogen gas and equipped with a cooling device for easy temperature control. Thereafter, 150 parts by weight of ethyl acetate (EAc) was introduced thereto as a solvent. Nitrogen gas was purged for about 60 minutes to remove oxygen, and then 0.09 parts by weight of AIBN (azobisisobutyronitrile) as a reaction initiator was introduced thereto while maintaining the temperature at 60° C. and reacted for about 8 hours to prepare a random copolymer (B8). The prepared random copolymer (B8) had a weight average molecular weight of 400,000 and a molecular weight distribution of 5.0.

Preparation Example 12. Preparation of Random Copolymer (B9)

A random copolymer (B9) was prepared in the same manner as in Preparation Example 11, except that a monomer mixture composed of 20.0 parts by weight of benzyl acrylate (BzA), 78.5 parts by weight of n-butyl acrylate (BA) and 1.5 parts by weight of hydroxybutyl acrylate (HBA) was introduced thereto. The random copolymer (B9) had a number average molecular weight of 320,000 and a molecular weight distribution of 5.1.

EXAMPLES AND COMPARATIVE EXAMPLES

Example 1

Preparation of Coating Liquid (Pressure-Sensitive Adhesive Composition)

0.25 parts by weight of a TDI-based cross-linking agent (Coronate L, manufactured by Japan NPU), 0.01 parts by weight of DBTDL (dibutyltin dilaurate) and 0.2 parts by weight of a silane coupling agent (SCA), relative to 100 parts by weight of the block copolymer (A1) prepared in Preparation Example 1, were mixed and ethyl acetate as a solvent was blended and controlled so as to have a coating solid content of about 25 wt % to prepare a coating liquid (pressure-sensitive adhesive composition).

Production of Pressure-Sensitive Adhesive Polarizing Plate

The prepared coating solution was coated on the release-treated surface of a release PET (poly(ethylene terephthalate)) (MRF-38, manufactured by Mitsubishi) having a thickness of 38 m so as to have a thickness after drying of about 23 m, and maintained in an oven at 80° C. for about 3 minutes. After drying, the coating layer formed on the release PET was laminated on one side of a polarizing plate (laminated structure of COP/PVA/COP: COP=cyclopolyolefin, PVA=polyvinyl alcohol-based polarizing film) to produce a pressure-sensitive polarizing plate. The results of measuring physical properties are shown in Table 5.

Examples 2 to 3 and Comparative Examples 1 to 9

A pressure-sensitive adhesive composition (coating liquid) and a pressure-sensitive adhesive polarizing plate were prepared in the same manner as in Example 1, except that upon preparing the pressure-sensitive adhesive composition (coating liquid), components and ratios were each adjusted as in Table 4 below.

TABLE 4

| | | Polymer | | Cross-linking | | SCA |
|---|---|---|---|---|---|---|
| | | Type | Content | agent content | DBTDL | content |
| Example | 1 | A1 | 100 | 0.25 | 0.01 | 0.2 |
| | 2 | A2 | 100 | 0.25 | 0.01 | 0.2 |
| | 3 | A3 | 100 | 0.25 | 0.01 | 0.2 |
| Comparative Example | 1 | B1 | 100 | 0.25 | 0.01 | 0.2 |
| | 2 | B2 | 100 | 0.25 | 0.01 | 0.2 |
| | 3 | B3 | 100 | 0.25 | 0.01 | 0.2 |
| | 4 | B4 | 100 | 0.25 | 0.01 | 0.2 |
| | 5 | B5 | 100 | 0.25 | 0.01 | 0.2 |
| | 6 | B6 | 100 | 0.25 | 0.01 | 0.2 |
| | 7 | B7 | 100 | 0.25 | 0.01 | 0.2 |
| | 8 | B8 | 100 | 0.25 | 0.01 | 0.2 |
| | 9 | B9 | 100 | 0.25 | 0.01 | 0.2 |

Content unit: part by weight
Cross-linking agent: Coronate L, manufactured by Japan NPU
DBTDL: dibutyltin dilaurate
SCA: a silane coupling agent having a beta-cyanoacetyl group (M812, manufactured by LG Chem)

TABLE 5

| | | Bending distance (mm) | Heat resistant durability at 100° C. | Moist-heat resistant durability at 65° C., 95% | IΔRI | Light leakage (heat resistant condition at 100° C.) | Light leakage (moist-heat resistant condition at 65° C., 95%) | Peel force (gf/25 mm) | Interface adhesive force (gf/25 mm) |
|---|---|---|---|---|---|---|---|---|---|
| Example | 1 | 16 | A | A | 0.957 | A | A | 380 | 3,450 |
| | 2 | 17 | A | A | 0.593 | A | A | 450 | 3,320 |
| | 3 | 18 | A | A | 0.982 | A | A | 420 | 3,210 |
| Comparative Example | 1 | 17 | B | B | 3.034 | C | C | 540 | 2,600 |
| | 2 | 2 | C | C | 4.365 | C | C | 2800* | 780 |
| | 3 | 20 | B | B | 3.087 | C | C | 520 | 3,130 |
| | 4 | 16 | C | C | 1.92 | C | C | 42 | 1,160 |
| | 5 | 17 | C | C | 1.952 | C | C | 40 | 1,450 |
| | 6 | 18 | C | B | 1.593 | C | C | 150 | 1,880 |
| | 7 | 19 | C | B | 1.601 | C | C | 100 | 1,850 |
| | 8 | 20 | C | B | 5.375 | C | C | 350 | 1,260 |
| | 9 | 21 | C | B | 2.72 | C | C | 330 | 1,100 |

*pressure-sensitive adhesive residue occurred on glass

The invention claimed is:

1. A pressure-sensitive adhesive composition containing a block copolymer, wherein the block copolymer comprises:
a first block having a glass transition temperature of 50° C. or higher and a first cross-linkable functional group; and
a second block having a glass transition temperature of −10° C. or lower and a second cross-linkable functional group and an aromatic group represented by Formula 2 below:

[Formula 2]

wherein, $R_1$ is hydrogen or an alkyl group, R2 is an alkylene group or an alkylidene group, m is an integer of 0 to 5, X is a single bond, an oxygen atom or a sulfur atom, and Ar is an aryl group.

2. The pressure-sensitive adhesive composition according to claim 1, wherein each of said first and said second cross-linkable functional groups is independently a hydroxy group, a carboxyl group, an epoxy group, or an isocyanate group.

3. The pressure-sensitive adhesive composition according to claim 1, wherein said second block comprises a polymerized unit derived from 20 to 98 parts by weight of (meth)acrylic acid ester, a polymerized unit derived from 1 to 40 parts by weight of a compound capable of providing said second cross-linkable functional group, and a polymerized unit derived from 1 to 40 parts by weight of a compound capable of providing said aromatic group.

4. The pressure-sensitive adhesive composition according to claim 3, wherein said first block comprises a polymerized unit derived from 80 to 99 parts by weight of (meth)acrylic acid ester and a polymerized unit derived from 1 to 20 parts by weight of a compound capable of providing said first cross-linkable functional group.

5. The pressure-sensitive adhesive composition according to claim 4, wherein each of said first block and said second block has a polymerized unit derived from a compound of Formula 1 capable of providing said first and second cross-linkable functional groups:

[Formula 1]

wherein, Q is hydrogen or an alkyl group, A and B are each independently an alkylene group or an alkylidene group, and n is an integer in a range of 0 to 10.

6. The pressure-sensitive adhesive composition according to claim 1, wherein said second block comprises a polymerized unit derived from 1 to 35 parts by weight of said compound capable of providing an aromatic group.

7. The pressure-sensitive adhesive composition according to claim 1, wherein said second block comprises 50 parts by weight or less of alkyl (meth)acrylate having 1 to 3 carbon atoms.

8. The pressure-sensitive adhesive composition according to claim 1, wherein said first block has a number average molecular weight (Mn) in a range of 10,000 to 250,000.

9. The pressure-sensitive adhesive composition according to claim 8, wherein said first block has a molecular weight distribution in a range of 1.0 to 3.0.

10. The pressure-sensitive adhesive composition according to claim 1, wherein said block copolymer has a number average molecular weight (Mn) in a range of 100,000 to 500,000 and a molecular weight distribution in a range of 2.0 to 5.0.

11. The pressure-sensitive adhesive composition according to claim 1, wherein said block copolymer is a diblock copolymer or a triblock copolymer.

12. The pressure-sensitive adhesive composition according to claim 1, wherein said block copolymer is a diblock copolymer comprising 5 parts by weight to 50 parts by weight of said first block and 50 parts by weight to 95 parts by weight of said second block.

13. The pressure-sensitive adhesive composition according to claim 12, wherein said diblock copolymer comprises 10 parts by weight to 30 parts by weight of said first block and 70 to 90 parts by weight of said second block.

14. The pressure-sensitive adhesive composition according to claim 1, further comprising 0.01 to 20 parts by weight of a cross-linking agent relative to 100 parts by weight of said block copolymer.

15. The pressure-sensitive adhesive composition according to claim 1, further comprising 0.1 to 20 parts by weight of an antistatic agent relative to 100 parts by weight of said block copolymer.

16. A pressure-sensitive adhesive optical laminate comprising an optical film; and a pressure-sensitive adhesive layer formed on at least one side of said optical film and formed from the pressure-sensitive adhesive composition of claim 1.

17. A pressure-sensitive adhesive polarizing plate having a polarizing plate comprising a polarizer; and a pressure-sensitive adhesive layer positioned on at least one side of said polarizing plate and formed from the pressure-sensitive adhesive composition of claim 1.

18. A display device comprising a liquid crystal panel; and the pressure-sensitive adhesive optical laminate according to claim 16.

19. A display device comprising a liquid crystal panel; and the pressure-sensitive adhesive polarizing plate according to claim 17 positioned on at least one side of said liquid crystal panel.

* * * * *